United States Patent Office 3,432,322
Patented Mar. 11, 1969

3,432,322
PROCESS OF MAKING STRUCTURAL ELEMENTS
WITH COMPACTED AGGREGATE
Dilworth T. Rogers, Summit, N.J., assignor to Esso Research and Engineering Company, a corporation of Delaware
No Drawing. Filed Oct. 7, 1964, Ser. No. 402,315
U.S. Cl. 106—281                                    8 Claims
Int. Cl. B28b *3/00;* E04b *1/00;* E04c *1/00*

ABSTRACT OF THE DISCLOSURE

An improved process of making structural elements which comprises converting aggregate to theoretical ideal particle size distribution by compacting the said aggregate in a confined space at a pressure between 18,250 and 19,500 p.s.i., mixing such particles with a bituminous binder, pressing the mixture into the desired shape at a high pressure and heating the shaped mixture at an elevated temperature in the presence of air.

---

This invention relates to a process of making building materials from a binder and soil. Particularly, the invention is directed to a process for making structural elements having a particular critical density. More particularly, the invention is directed to a process for making building materials which are prepared from a soil which is compacted so as to provide a critical particle size and a bituminous material to bind the soil particles together. Most particularly, this invention is directed to a process of converting sand to a distribution of particle sizes closely approximating the theoretical ideal size for maximum density of a structural element consisting of such sand particles and a binder material.

Heretofore in the art, structural elements made from soil and bituminous or other binders have certain inherent defects such as they tend to fail when exposed to water or heavy loads. These deficiencies in the element are due primarily to the void space within the block. The void spaces result from the nonideal particle size distribution of the aggregate in the structural element. Various methods have been tried to increase the compressive strength and the water impermeability of the structural elements. One method for producing blocks which are impermeable to water was to increase the amount of binder. However, blocks made in such a manner tend to soften and crack during heat curing. The blocks also, when included in a bearing structure, could not sustain any significant load.

The problem of particle size distribution was recognized by the art and attempts have been made to provide aggregate having an ideal particle size distribution. One such procedure was to select soils having different particle sizes and mix them in predetermined ratio amounts with the hope that mixing would provide for the random distribution of the particles in such a manner to effect an ideal distribution of the particles. Such procedures are expensive, time consuming and not very effective since the particles could not be effectively matched.

It is, of course, known that heretofore in the art soils, after being mixed with a suitable binder, have been compacted. However, such compaction does not provide a particle size distribution substantially identical to the ideal particle size distribution and the particles are not covered with binder, that is, the freshly prepared surfaces are generally uncovered. Another prior art method for providing aggregate with the proper particle size was to grind the aggregate particles. The ground aggregate did not have the random particle size necessary to provide the best compressive strength for building blocks and therefore separation of the particles and recombination according to particle size was necessary.

It has now been found that a substantially ideal particle size distribution can be effected quickly and easily by subjecting the coarse soils or minerals to compaction within a confined space. After the confined compaction of the aggregate, the aggregate is then mixed with a suitable binder, compressed into shape, and cured by heating in an oxygen containing atmosphere at a temperature between 300° and 500° F. for from 4 to 32 hours.

In the practice of this invention, the soils to be used should have a particle size no larger than about 20 mesh. That is, particles which are held on the 20-mesh screen are generally too large for use as the aggregate in making structural elements in accordance with this invention. Generally, builder's sand, that is, sand of 20 to 40 mesh, can be very effectively used as the aggregate. Such sand as the 20 to 40 mesh is sand that passes through a 20-mesh screen but is held on a 40-mesh screen. The aggregates which can be used in the practice of this invention include silicate sands and other minerals.

The binders which can be used in the practice of this invention can be any of the bituminous materials and mixtures of bituminous materials with resins or waxes which are known to the art or other polymeric substances or substances which may be polymerized in the presence of aggregates. Examples of bituminous materials include coal tar derivatives and petroleum base derivatives. Examples of binders which can be used in the practice of this invention are particularly set forth in copending commonly assigned application Ser. No. 324,075 now U.S Patent 3,287,146.

In the practice of this invention, the aggregate is compacted rapidly in a confined space. The compaction pressure will be dependent upon the nature of the aggregate being compacted. With aggregates such as sand, the compaction pressure should be between about 18,250 to 19,500 p.s.i., preferably at a pressure of 18,500 to 19,000 p.s.i. For aggregates which are more angular and more easily crushed, pressures of less than 2500 p.s.i. can be used.

Aggregates such as shales, limestone and crushed sandstone can be rapidly compacted at pressures as low as 2500 p.s.i. For the aggregates which are more angular and more easily crushed than sand, the primary consideration as to an upper limit to be used will, of course, be the cost of equipment when considered in relationship to the size of the particles being crushed. The aggregate after being compacted in a confined space is then mixed with binder, pressed into a desired shape at a pressure of about 1000 to 8500 p.s.i. The shaped article is then treated so as to harden the binder, thereby giving compressive strength to the article. If the binder is asphalt the shaped article is heat treated at a temperature between 350° to 500° F. for a time from about 4 to 32 hours. Preferably, the asphalt aggregate article is compacted and then heat treated at a temperature about 400° F. The compaction of the aggregate should be as rapid as possible. The aggregate is not mixed with any binder or solvents prior to being compacted. The aggregate should be substantially dry when compacted prior to mixing with the binder. By substantially drying it is meant that the aggregate should not have more than about 5 vol. percent of a fluid when subjected to the compaction prior to mixing with binder. Normally the binder will contain less than the 5 vol. percent fluid and generally the binder will be dry to the touch.

The following experimentations were conducted in order to show the unexpected results provided by the instant invention.

A sample of builder's sand, 20 to 40 mesh (passes 20 and held on 40 mesh) was compacted in a cylindrical mold. The results of screen analyses on the compacted powder are given in Table I as follows.

TABLE I.—COMPACTION OF BUILDER'S SAND (Compaction pressure, 18,750 p.s.i.)

| Screen analysis: | Percent of sand |
|---|---|
| On 40 mesh | 42.2 |
| On 60 mesh | 18.7 |
| On 80 mesh | 7.6 |
| On 100 mesh | 5.6 |
| On 200 mesh | 10.2 |
| On 325 mesh | 6.4 |
| Through 325 | 9.5 |

The results of the 18,750 p.s.i. compaction were compared with a calculated optimum distribution for a 3-size mixture (Chemistry and Physics of Clays, G. Searle and Grimshaw, p. 372, Ernst Benn Ltd., 1959). It was found that by confined compaction, a particle size distribution is obtained which is similar to that calculated for the ideal particle size of a mixture of spheres in which the largest is 20 mesh (0.84 mm. in diameter).

The calculated voids content for 20 to 40 mesh builder's sand is 43%. In the confined compaction of dry builder's sand, the density was 2.02 g./cc., corresponding to a voids content of 23.5%.

In order to illustrate the advantage of this invention, 20 to 40 mesh builder's sand was compacted (dry) at 18,750 p.s.i. The resulting powder was hot mixed at 300° F. with Binder C asphalt (89 Pen. 77° F.). The sand and asphalt were compacted at 7820 p.s.i. and cured in air at 400° F. for 16 hours. As shown by the data in Table II, the compressive strength of a 3×1.28 inches cylindrical briquette prepared by this method was nearly twice as strong as a briquette which was prepared by hot mixing the asphalt with builder's sand and compacting at 18,750 p.s.i. followed by curing at 400° F.

TABLE II.—BUILDER'S SAND (20 TO 40 MESH) AND 8% BINDER C

[Compaction at 75° F.; curing, 400° F., 16 hours]

| | Compaction conditions | | |
|---|---|---|---|
| | Sand and asphalt at 18,750 p.s.i. | Sand and asphalt at 7,820 p.s.i. | Sand at 18,750 p.s.i. then sand and asphalt at 7,820 p.s.i. |
| Compressive strength, p.s.i. | 3,400 | 2,915 | 5,810 |
| Briquette density, g./cc. | 2.11 | 1.94 | 2.15 |
| Soil density, g./cc., of briquette | 1.96 | 1.79 | 1.98 |

As can be seen from the foregoing table, the compaction of the aggregate, prior to mixing with the binder, increased the strength of the element about 200% as compared to the prior art produced elements.

What is claimed is:

1. A new and improved process of making structural elements which comprises the steps of:
   (a) compacting a coarse aggregate in a confined space, whereby a desired particle size distribution is secured,
   (b) mixing the compacted aggregate with from about 2 to 25 wt. percent of a bituminous binder, and
   (c) pressing the mixture of step (b) into a desired shape at a pressure between about 1500 to 8500 p.s.i., and heat treating the pressed mixture at a temperature in the range from about 350° to 500° F.

2. A new and improved process of making structural elements which comprises the steps of:
   (a) compacting a coarse aggregate in a confined space, whereby a desired particle size distribution is secured,
   (b) mixing the compacted aggregate with from about 2 to 25 wt. percent of a bituminous binder,
   (c) pressing the mixture of step (b) into a desired shape at a pressure between about 1500 to 8500 p.s.i., and
   (d) heat treating the pressed mixture at a temperature of 350° to 500° F. for a time from about 4 to 32 hours.

3. A new and improved process of making structural elements which comprises the steps of:
   (a) readily compacting sand in a confined space at a pressure between about 18,250 and 19,500 p.s.i., whereby a desired particle size distribution is secured,
   (b) mixing the compacted aggregate with 2 to 25 wt. percent asphalt binder,
   (c) pressing said mixture into shape at a pressure between about 1500 to 8500 p.s.i., and
   (d) heating the compacted mixture to a temperature between about 350° and 500° F. in air for a time from about 4 to 32 hours.

4. A process as in claim 3 wherein said sand is 20 to 40 mesh builder's sand.

5. A process as in claim 3 wherein said aggregate is compacted in a confined space at a pressure of between 18,500 and 19,000 p.s.i.

6. A process as in claim 3 wherein the compacted aggregate is hot mixed with Binder C asphalt which has a penetration of 99 at 77° F.

7. A new and improved process of making structural elements which comprises the steps of:
   (a) readily compacting 20 to 40 mesh builder's sand in a confined space at a pressure of 18,750 p.s.i., whereby a desired particle size distribution is secured,
   (b) mixing the compacted aggregate with Binder C asphalt having a penetration of 89 at 77° F., said mixing being conducted at a temperature of 300° F.,
   (c) pressing the mixture into shape at a pressure of 7820 p.s.i., and
   (d) heating the pressed mixture at a temperature of 400° F. for 16 hours.

8. Process as defined by claim 7 wherein said particle size distribution is about

| Screen analysis: | Percent of sand |
|---|---|
| On 40 mesh | 42.2 |
| On 60 mesh | 18.7 |
| On 80 mesh | 7.6 |
| On 100 mesh | 5.6 |
| On 200 mesh | 10.2 |
| On 325 mesh | 6.4 |
| Through 325 mesh | 9.5 |

References Cited

UNITED STATES PATENTS

| 3,062,672 | 11/1962 | Kerkhoven et al. | 106—281 |
| 3,070,449 | 12/1962 | Davies et al. | 106—284 |
| 3,168,602 | 2/1965 | Davies et al. | 264—29 |
| 3,261,892 | 7/1966 | Sommer et al. | 264—29 |
| 3,287,146 | 11/1966 | Rogers et al. | 106—281 |

JULIUS FROME, *Primary Examiner.*

JOAN B. EVANS, *Assistant Examiner.*

U.S. Cl. X.R.

106—38.8, 55, 71, 280, 284; 264—29